(12) United States Patent  
Mathy, Jr.

(10) Patent No.: US 8,961,861 B2
(45) Date of Patent: Feb. 24, 2015

(54) MOLD CLAMP OPENING/CLOSING DEVICE

(75) Inventor: John M. Mathy, Jr., Stewartstown, PA (US)

(73) Assignee: Graham Engineering Corporation, York, PA (US)

( * ) Notice: Subject to any disclaimer, the term of this patent is extended or adjusted under 35 U.S.C. 154(b) by 444 days.

(21) Appl. No.: 13/525,416

(22) Filed: Jun. 18, 2012

(65) Prior Publication Data

US 2013/0333179 A1    Dec. 19, 2013

(51) Int. Cl.
*B29C 49/56* (2006.01)

(52) U.S. Cl.
USPC ........ 264/543; 264/538; 425/195; 425/451.4; 425/541

(58) Field of Classification Search
CPC ........................... B29C 49/56; B29C 2049/563
USPC ................. 425/451.4, 541, 576, DIG. 5, 195; 264/39, 523, 334, 538, 543
See application file for complete search history.

(56) References Cited

U.S. PATENT DOCUMENTS

| | | | | |
|---|---|---|---|---|
| 3,334,379 A | * | 8/1967 | Di Settembrini | 425/541 |
| 3,764,250 A | * | 10/1973 | Waterloo | 425/541 |
| 3,877,861 A | * | 4/1975 | Kiefer et al. | 425/541 |
| 3,883,286 A | * | 5/1975 | Kinslow et al. | 425/451.4 |
| 4,786,245 A | * | 11/1988 | Windstrup et al. | 425/541 |
| 5,840,349 A | * | 11/1998 | Brown et al. | 425/541 |
| 6,053,723 A | * | 4/2000 | Guiffant et al. | 425/541 |
| 7,137,804 B2 | * | 11/2006 | Mue et al. | 425/451.4 |
| 7,278,848 B2 | * | 10/2007 | Hansen | 425/451.4 |
| 7,905,720 B2 | * | 3/2011 | Freire-Diaz et al. | 425/541 |
| 8,257,076 B2 | * | 9/2012 | Tsay et al. | 425/541 |

OTHER PUBLICATIONS

Graham Engineering Corporation, "Work Instructions 034—Document No. WI034.1.01", 4 pgs., 2009.

* cited by examiner

*Primary Examiner* — James MacKey
(74) *Attorney, Agent, or Firm* — McNees Wallace & Nurick LLC

(57) ABSTRACT

A device and method for moving a mold clamp assembly of a molding apparatus between and open and closed position when the molding apparatus is in a stationary position. The device includes a rotatable cam member. A first cam surface is provided on the rotatable cam member. The first cam surface cooperates with a cam follower of the mold clamp assembly to move the mold clamp assembly to the open position when the rotatable cam member is rotated. A second cam surface is also provided on the rotatable cam member. The second cam surface cooperates with the cam follower of the mold clamp assembly to move the mold clamp assembly from the open position to the closed position when the rotatable cam member is further rotated.

19 Claims, 6 Drawing Sheets

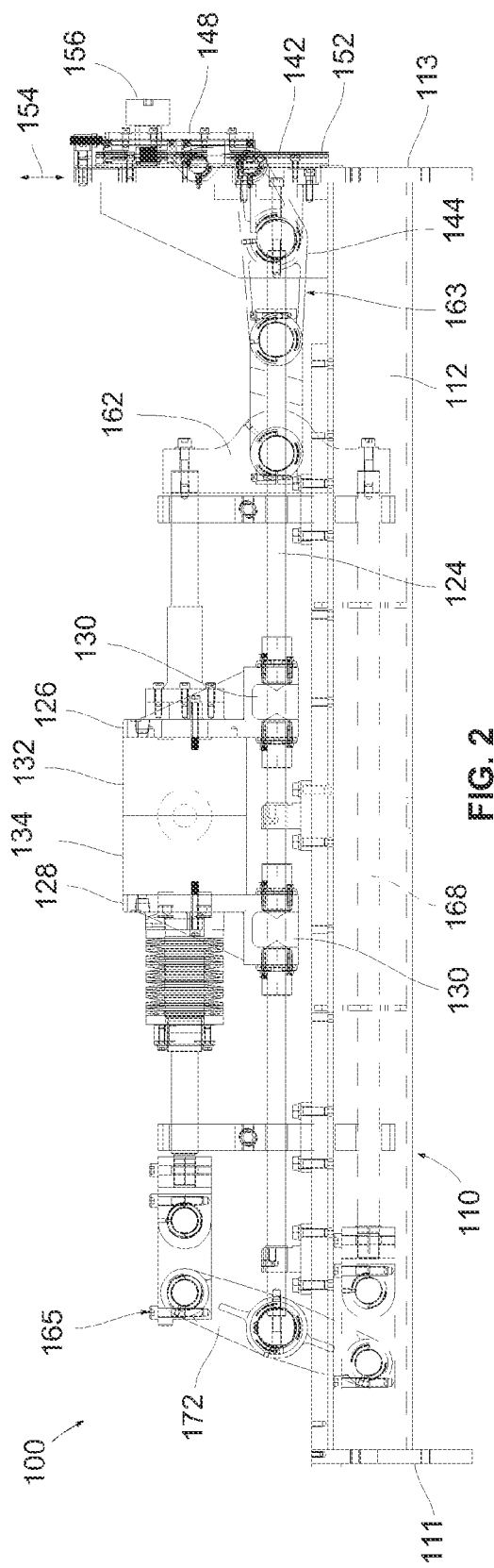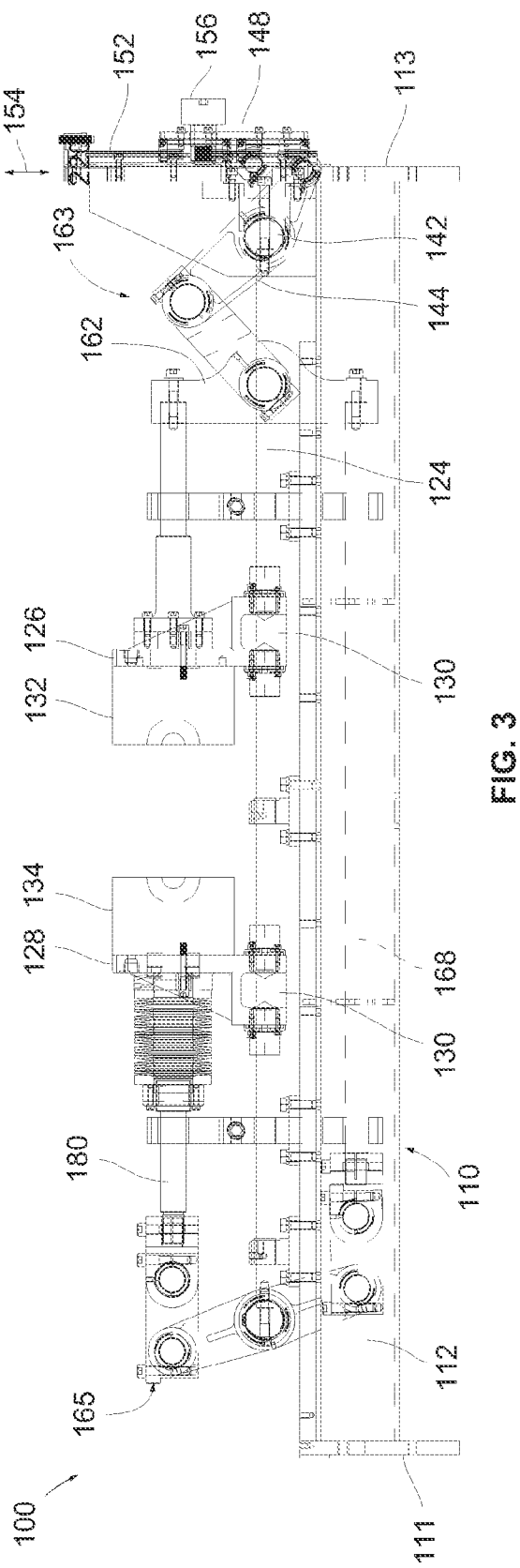

MOLD CLAMP OPENING/CLOSING DEVICE

FIELD OF THE INVENTION

The invention relates generally to a mold clamp opening/closing device for use with a molding apparatus. Specifically, the mold clamp opening/closing device cooperates with mold clamping stations of the rotary molding apparatus to automatically open and close the mold clamping stations to facilitate repair and maintenance of the mold clamping stations and the replacement of molds therein.

BACKGROUND OF THE INVENTION

Conventional rotary extrusion blow molding apparatuses typically have a structural frame mounted on a rotating shaft. The structural frame has a plurality of molds mounted thereon and is known in the industry as a wheel. As the wheel is rotated, the plurality of molds is rotated past an extrusion die extruding a continuous parison. Each mold typically includes two mold halves, each comprising a mold cavity half therein, such that when the mold halves are closed, the mold defines a mold cavity corresponding to the configuration of the article to be molded, such as a container. Each mold, seriatim, is rotated past the extrusion die with the mold halves in an open configuration. The mold halves of each mold are then closed around the parison to enclose the parison within the mold defined by the mold halves. A blowing needle is then inserted into the parison within the closed mold and internal pressure is introduced to the parison, forcing it to inflate and conform to the configuration of the mold cavity. The molded object is then cooled and the mold opened to release the molded object from the mold.

When the two mold halves are clamped over one or more parisons prior to blowing of the parisons to form plastic containers, high clamp forces are required to close the mold halves on the parisons to pinch off the plastic and to hold the mold halves closed during blow molding. Conventional mold clamp assemblies are mounted on the frame of the machine supporting the assembly and, when actuated, transmit clamping force from a drive on one side of the mold to the other side of the mold through the frame. Alternatively, U.S. Pat. No. 7,611,657 discloses a mold clamp assembly for a rotary-type or shuttle-type blow molding machine. The clamp assembly is mounted on a frame and includes a mold opening and closing drive connected to the two mold halves independently of the frame, so that when the mold halves are closed, clamp forces are not transmitted to the mold halves through the frame.

Regardless of the transmission of forces, as the wheel is rotated, cam followers positioned on each mold engage a cam track. The cam followers follow the cam track, causing the cam followers to move laterally relative to the rotational movement of the wheel. The lateral movement of the cam followers controls the position of the mold halves and their movement between the open and closed positions.

The blow molding apparatuses described above are typically costly, heavy machines, which require a good deal of expertise to maintain. For example, when a mold clamp requires maintenance, the entire wheel must be taken off-line as the mold clamp is worked on. Currently, in order to perform maintenance or to change the molds, an operator/technician is positioned at the rear of the wheel, which is on the side opposed to the parison. In this position, the mold clamps and molds are generally presented to the operator/technician in a closed position. The wheel is stopped and the operator/technician must open the mold clamps in order to change to molds or to perform adjustments, repair or maintenance to the mold clamps. This requires a significant force to be applied to the mold clamp to overcome the clamp force. This force is currently applied by the use of a manually operated mold wrench.

Accordingly, there is a need for a device and improved method of opening and closing the mold clamp to perform maintenance and repair. In particular, there is a need to have a mold clamp opening/closing device which can automatically open and close the mold to facilitate the repair and maintenance of the mold clamps and allow for the molds to be changed more quickly and efficiently, thereby reducing the downtime of the molding apparatus, reducing the overall cost of the molding apparatus and lessening the impact to the operator or technician performing the repair and/or maintenance.

SUMMARY OF THE INVENTION

An embodiment is directed to a device for moving a mold clamp assembly of a molding apparatus between and open and closed position when the molding apparatus is in a stationary position. The device includes a rotatable cam member. A first cam surface is provided on the rotatable cam member. The first cam surface cooperates with a cam follower of the mold clamp assembly to move the mold clamp assembly to the open position when the rotatable cam member is rotated. A second cam surface is also provided on the rotatable cam member. The second cam surface cooperates with the cam follower of the mold clamp assembly to move the mold clamp assembly from the open position to the closed position when the rotatable cam member is further rotated.

An embodiment is directed to a rotary molding apparatus. The rotary molding apparatus includes a wheel with mold clamp assemblies mounted thereon and a drive mechanism for driving the wheel. A device is also provided for automatically moving a respective mold clamp assembly between an open and a closed position when the rotary molding apparatus is in a stationary position. When the drive mechanism is disengaged, the device may be moved into cooperation with the respective mold clamp assembly to move the mold clamp assembly to the open position to allow maintenance to be performed on the respective mold clamp assembly.

An embodiment is directed a method of accessing a mold clamp assembly of a rotary molding machine. The method comprising: stopping the movement of the rotary molding machine to position a respective mold clamp assembly proximate to a mold clamp opening/closing device; engaging the mold clamp opening/closing device to allow the mold clamp opening/closing device to engage cam followers of the mold clamp assembly; moving a first cam surface of the mold clamp opening/closing device from a first position to a second position to cooperate with the cam follower of the mold clamp assembly to move the cam follower and the mold clamp assembly to an open position; and moving a second cam surface of the mold clamp opening/closing device from the second position to the first position to cooperate with the cam follower of the mold clamp assembly to move the cam follower and the mold clamp assembly from the open position to a closed position.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a side view of an exemplary modular mold clamp assembly for use in the blow molding machine of FIG. 1, the modular mold clamp assembly having molds inserted therein and being shown in the closed position.

FIG. 3 is a side view of the modular mold clamp assembly of FIG. 2, the modular mold clamp assembly having molds inserted therein and being shown in the open position.

DETAILED DESCRIPTION OF THE INVENTION

The exemplary mold clamp opening/closing device described herein can be used with various rotary type machines, including, but not limited to, the exemplary rotary blow molding machine shown and described in co-pending U.S. patent application Ser. No. 12/898,832, filed on Oct. 6, 2010, which is hereby incorporated, in its entirety, by reference.

The exemplary rotary blow molding machine is adapted to engage a tubular parison and transform the same into hollow, molded objects, such as containers of various types. As is known in the industry, the parison comprises resin which is homogeneously melted within an extruder of suitable type.

Figure 1:
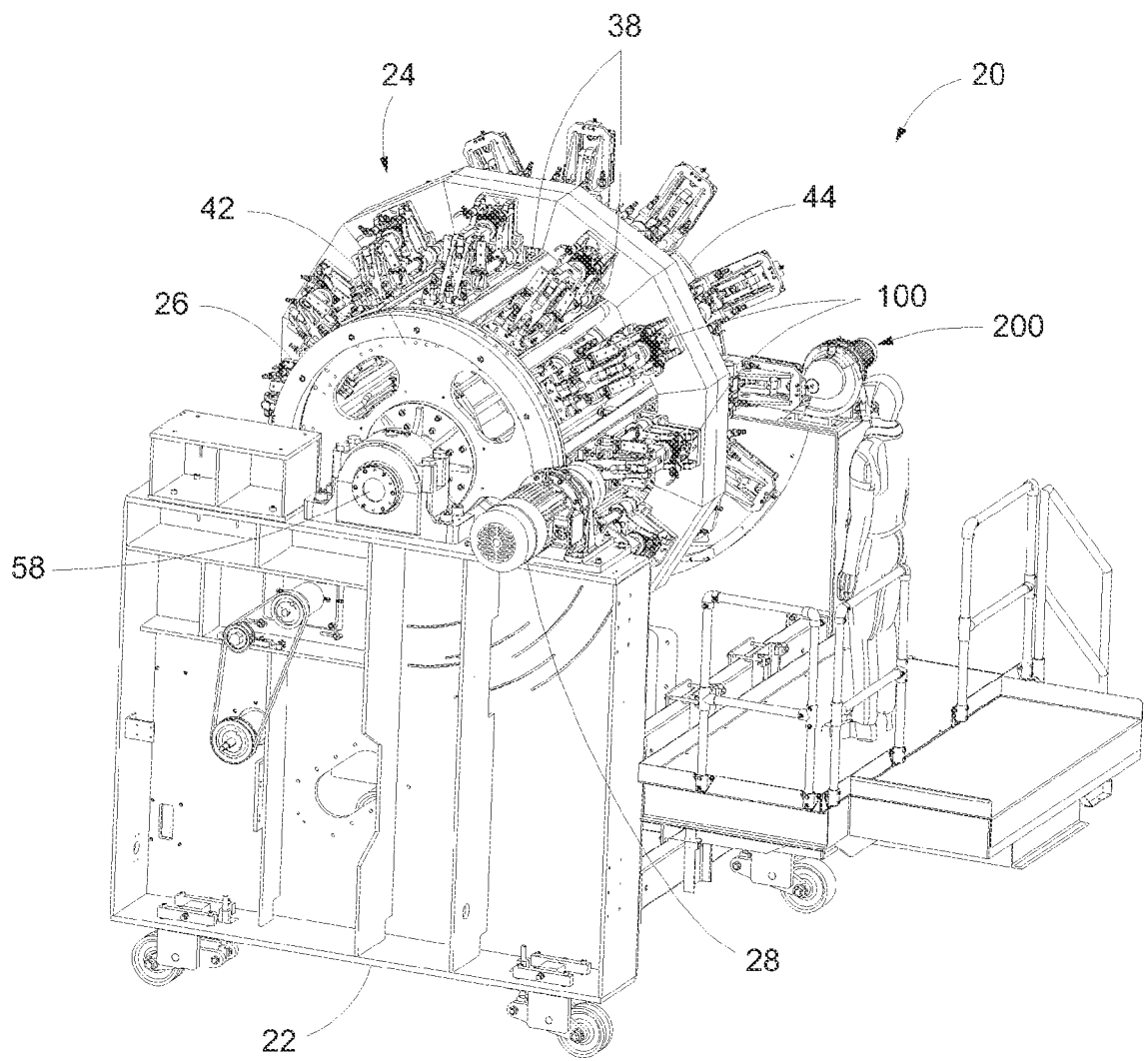
FIG. 1 is a perspective view of an exemplary blow molding machine embodying the principles of the present invention.

Referring now to FIG. 1, the exemplary plastic blow molding machine 20 includes a base 22 and a movable member or wheel 24 mounted on the base for rotation thereon about a rotational axis A. The movable member 24 may be in the form of a wheel or other such configurations which are rotatable about the rotational axis. As illustrated, the blow molding machine includes a ring gear or drive gear 26 driven by a drive mechanism 28. The ring gear 26 is mounted to turntable 42 and rotates the wheel 24. The ring gear 26 and drive mechanism 28 generally operate at a predetermined speed which is capable of adjustment by conventional means.

As best shown in FIG. 1, the plastic blow molding machine 20 includes a plurality of blow molding stations 38 mounted on the wheel 24 for rotation therewith about the rotational axis A. As shown in the exemplary embodiment, the wheel 24 has fourteen mold stations 38, provided between components or turntables 42, 44 of the wheel 24, although other configurations may be used. The components 42, 44 may be in the form of turntables or other such configurations which are rotatable about the rotational axis. The turntables 42, 44 of wheel 24 are mounted for rotation within a substantially vertical plane transverse to the axis of the base 22.

The turntables 42, 44 of wheel 24 are fixed to and carried by respective shafts 58. Each of the turntables 42, 44 is prevented from inward axial movement and disengagement from respective stub shafts 58 by any known suitable means, such as a lock ring. Extending between turntables 42, 44, at each mold station 38 and in even, circumferentially-spaced relationship to each other, are the mold clamp assemblies 100, which are firmly secured at the ends thereof, respectively, to the turntables 42, 44. The circumferentially-spaced arrangement of the various mold clamp assemblies 100 is best illustrated in FIG. 1.

Referring to FIGS. 2 and 3, an exemplary embodiment of mold clamp assembly 100 is shown. However, other configurations of the mold clamp assembly 100 may be used without departing from the scope of the invention.

In the exemplary embodiment, the frame 110 has a base member 112 and two oppositely-facing end members 111, 113. The end members 111, 113 extend from either end of the base member 112 in a direction that is essentially transverse to the longitudinal axis of the base member 112. The end members 111, 113 are integrally attached to the base member in any known manner which has the strength characteristics required. Mounting openings (not shown) are provided on the frame 110 proximate the ends of the base member 112. The openings cooperate with mounting hardware (not shown) to mount the modular mold clamp assembly 100 to mounting openings (not shown) of the turntables 42, 44 of the wheel 24. The base member 112 and end members 111, 113 are made from any material that has the strength characteristics required to support the components of the modular mold clamp assembly 100 and to provide the structural integrity required to support the radially extending turntables 42, 44 of the wheel 24.

Each modular mold clamp assembly 100 includes mold platens 126 and 128 which are mounted on the rods 124 by slides 130 which permit movement of the platens toward and away from each other during closing and opening of mold halves 132 and 134 mounted on platens 126 and 128, respectively. FIG. 2 illustrates the assembly 100 with the mold halves closed, while FIG. 3 illustrates the assembly 100 with the mold halves open.

Pin 142 extends through a portion of end member 113. The adjacent ends of rods 124 are secured to the pin. Pivot arm 144 is rotatably mounted on pin 142 between the rods 124. The outer end 146 of arm 144 away from the mold halves extends through an opening in end member 113 and is connected to follower slide 148. The follower slide 148 is mounted on the outside surface of the end wall 113 by slide 152 to permit movement of the slide back and forth in the direction of arrow 154, shown in FIGS. 2 and 3. The follower slide 148 carries cam follower roller or cam follower 156, which extends into circumferential cam track or slot of the blow molding machine. Rotation of wheel 24 moves follower 156 into and around the cam track or cam slot of cam unit to move follower slide 148 inwardly and outwardly and rotate arm 144 between the positions shown in FIGS. 2 and 3.

With the mold halves 132 and 134 in the open position and drive link 163 retracted as shown in FIG. 3, rotation of wheel 24 moves the open mold halves 132, 134 past the extrusion station to either side of a number of parisons extruded from an extrusion head. Rotation of the wheel 24 also moves follower 156 along a radially outward portion of a cam slot to move follower slide 148 radially outwardly from the position of FIG. 3 to the position of FIG. 2. This movement rotates arm 144 counterclockwise from the position of FIG. 3 to the position of FIG. 2. Movement of the actuating means to affect such opening and closing movements of the mold die is achieved by mold-actuating cam means.

During the operation of the wheel 24, it is not uncommon to have problems with one or mold clamp assemblies which must be addressed. It is also common to have scheduled maintenance. In order to repair or perform maintenance on one or more particular mold clamp assemblies, the operation of the wheel is stopped and the repair or maintenance is performed on the mold clamp assembly as the assembly is still attached to the wheel. Currently, this is done using a manual process in which the operator/technician uses a mold wrench to open and close the mold clamp assembly to perform the repair or maintenance. As the opening and closing of the mold is labor intensive, only select operators/technicians can perform the function. In addition, the manual operation is slow, which increases the downtime for the entire operation and affects the productivity of the operation.

In contrast, the mold clamp opening/closing device 200 described herein overcomes the problems associated with the prior art. As the mold clamp opening/closing device 200 is fully automated, the repair and maintenance of the modular mold clamp assemblies can be performed by any operator/technician. In addition, as this process is automated, the repair or maintenance may be accomplished with minimal downtime for the wheel, thereby minimizing the impact to the productivity of the operation.

As shown in FIG. 1, the mold clamp opening/closing device 200 is mounted on the base 22 of the machine 20. The mold clamp opening/closing device 200 can be mounted to the base using various known mounting hardware or techniques. In the embodiment shown, the mold clamp opening/closing device 200 is positioned proximate the wheel 24 at a location which is essentially opposite the location of the parison. This location allows the mold clamp opening/closing device 200 to be positioned in an area of the wheel 24 which has sufficient space and clearance to allow the operator/technician to properly repair or maintain the parts of the machine 20 which are provided in front of the operator/technician.

Figure 4:
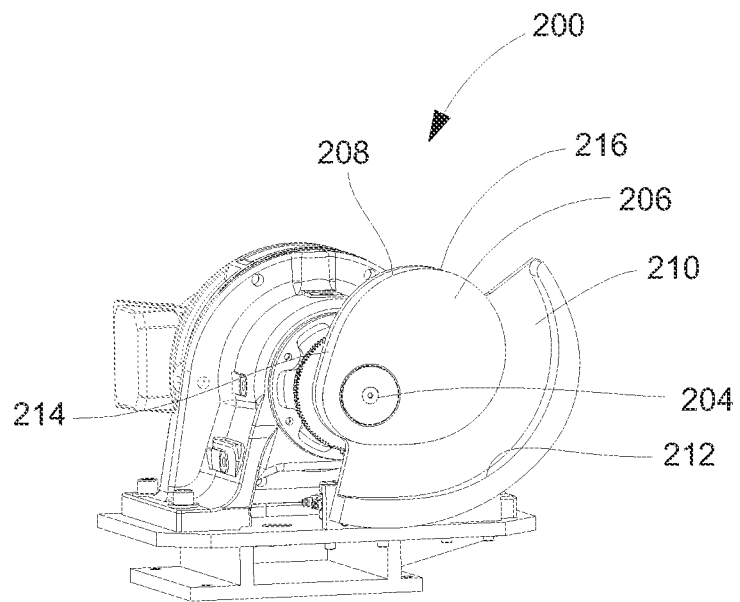
FIG. 4 is a perspective view of an exemplary mold clamp opening assembly according to the present invention.
Figure 5:
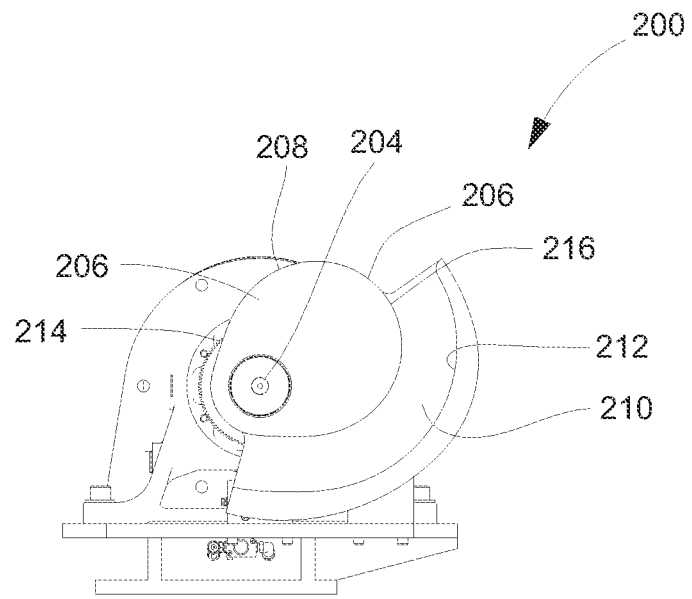
FIG. 5 is a side elevational view of the mold clamp opening assembly of FIG. 4.
Figure 6:
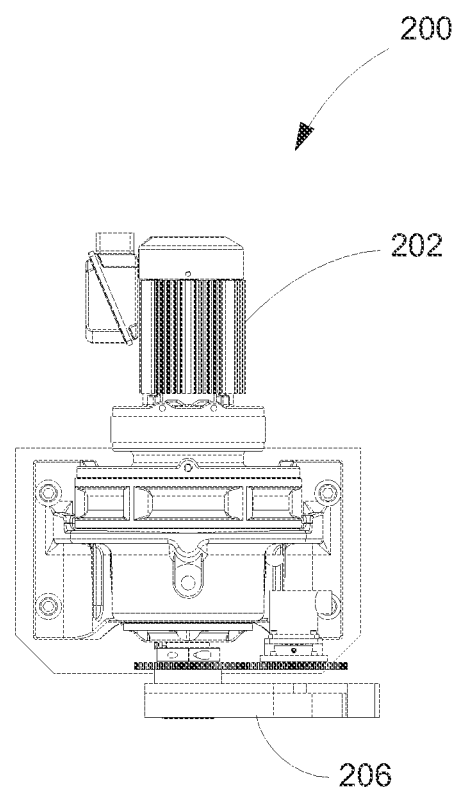
FIG. 6 is a top view of the mold clamp opening assembly of FIG. 4.

Referring to the exemplary embodiment shown in FIGS. 4 through 6, the mold clamp opening/closing device 200 has a motor 202, a shaft 204, a rotatable eccentric cam member 206, a first cam surface 208, a cam track 210, and a second cam surface 212. In the exemplary embodiment shown, the first cam surface 208 has a generally flat or straight surface portion 214 and a generally curved or arcuate surface portion 216. The second cam surface 212 has an essentially arcuate configuration.

As the motor 202 is engaged, the motor 202 causes the shaft 204 to rotate. As the shaft 204 is rotated, the cam member 206 also rotates causing the first cam surface 208 to rotate about the shaft 204. As the cam track 210 is attached to the cam member 206, the rotation of the shaft 204 also causes the cam track 210 and the second cam surface 21 to rotate.

The operation of the mold clamp opening/closing device 200 will be now be described with reference to FIGS. 7 through 10.

Figure 7:
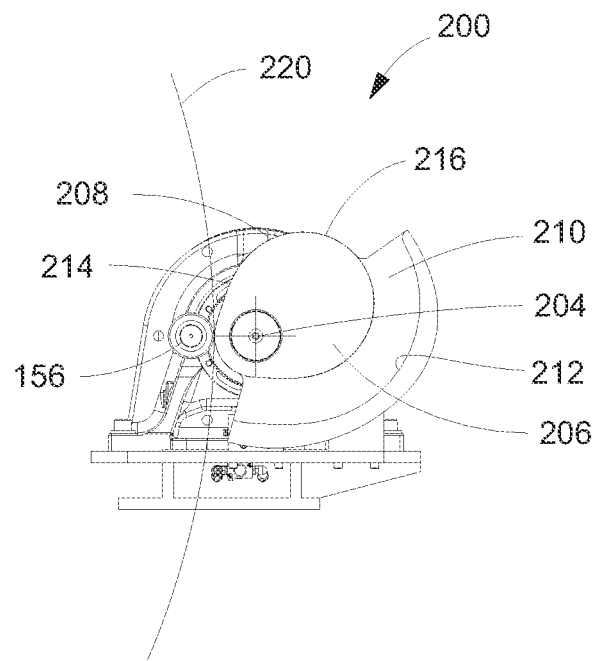
FIG. 7 is a diagrammatic view of the mold clamp opening assembly with a cam follower positioned adjacent thereto, the cam follower is shown in a position which corresponds to the mold clamp assembly being positioned in the closed position.

FIG. 7 represents the position of the mold clamp opening/closing device 200 when the machine 20 is in its normal operating mode. In this initial or first position, the mold clamp opening/closing device 200 is positioned out of the path 220 of the cam followers 156. This allows for the rotation of the wheel 24 as described in co-pending U.S. patent application Ser. No. 12/898,832 which was previously incorporated herein by reference.

The path 220 shown in FIG. 7 represents the path of the cam followers 156 when the modular mold clamp assemblies 100 are in the closed position. The straight surface portion 214 of the first cam surface 208 is positioned proximate the path 220 of the cam followers 156. This allows the cam followers 156 to pass by the mold clamp opening/closing device 200 without engaging the mold clamp opening/closing device 200, allowing the wheel 24 to rotate in its normal mode of operation without interference from the mold clamp opening/closing device 200.

The path 220 represents the position of the cam followers 156 in the closed position, in which the radius (as measured from the center of the wheel 24) of the path of the cam followers 156 is greater than if the assemblies 100 are provided in any other position. Therefore, even if a respective modular mold clamp assembly 100 was not properly closed, the clearance between the cam follower 156 and the mold clamp opening/closing device 200 would be greater than that shown in FIG. 7, thereby ensuring that the mold clamp opening/closing device 200 would not engage or interfere with the cam follower 156 during normal operation.

Figure 8:
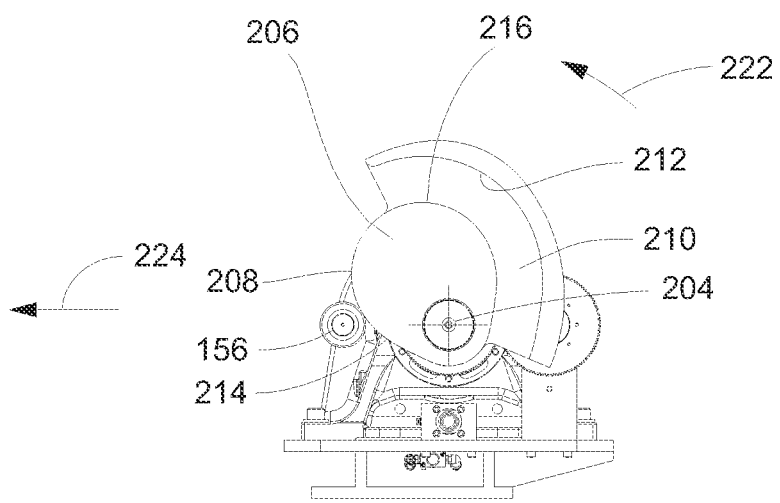
FIG. 8 is a diagrammatic view of the mold clamp opening assembly with a cam follower positioned in engagement with a cam surface of the mold clamp opening assembly, the cam follower is shown in a position which corresponds to the mold clamp opening assembly being positioned between the closed position and the open position.

When repair or maintenance is to be performed on the machine 22 or any component thereof, the normal operation of the wheel 24 is stopped. A respective station 38 is positioned in alignment with the mold clamp opening/closing device 200, such that the cam follower 156 is positioned proximate the mold clamp opening/closing device 200, as shown in FIG. 7. The mold clamp opening/closing device 200 is then rotated in a counter clockwise direction as represented by arrow 222 of FIG. 8. As the rotation occurs, the first cam surface 208 of the cam member 206 engages the cam follower 156, as represented in FIG. 8. The continued rotation causes the first cam surface 208 to move the cam follower 156 inward, toward the center of the turntable 44, as represented by arrow 224. The inward motion of cam follower 156 causes the modular mold clamp assembly 100 to move toward the open position.

It is worth noting that the configuration of the straight surface portion 214 of the first cam surface 208 of the eccentric cam member 206 allows the first cam surface 208 to engage the cam follower 156 regardless of whether the modular mold clamp assembly 100 is fully closed or partially open. During the molding process, pressure may build up in the mold halves 132, 134 when the mold halves are in the closed position. This can be caused by excessive mold flow or other known issues. This increased pressure may cause the mold halves to separate, causing the modular mold clamp assembly 100 and the cam follower 156 to be in a partially open position. The mold clamp opening/closing device 200, and in particular, the straight surface portion 214 of the first cam surface 208 of the cam member 206 is configured to properly engage the cam follower 156 regardless of whether the modular mold clamp assembly 100 is fully closed or partially open. If the modular mold clamp assembly 100 is fully closed, the straight surface portion 214 of the first cam surface 208 will engage the cam follower 156 sooner than if the modular mold clamp assembly 100 is partially open.

Figure 9:
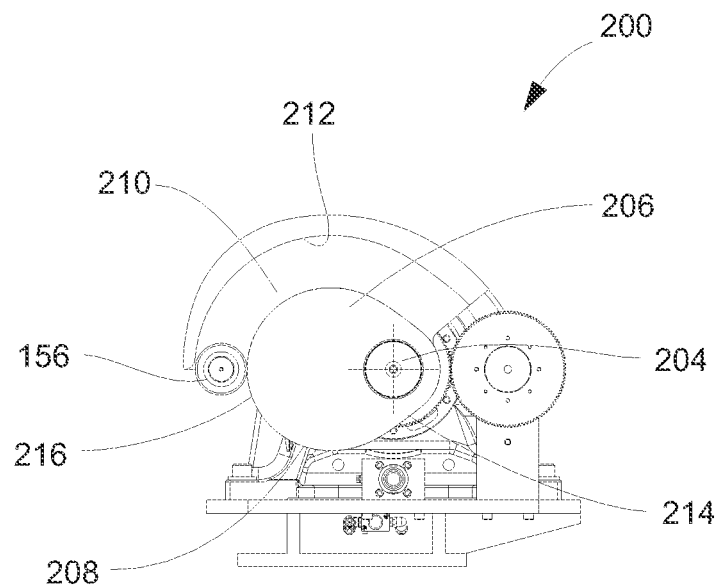
FIG. 9 is a diagrammatic view of the mold clamp opening assembly with a cam follower entering a cam track of the mold clamp opening assembly; the cam follower is shown in a position which corresponds to the mold clamp opening assembly being positioned in the open position.

Rotation of the mold clamp opening/closing device 200 continues until the mold clamp opening/closing device 200 is in the position shown in FIG. 9. In this second position, the cam follower 156 is moved inward causing the modular mold clamp assembly 100 to be in the open position. In this position, repair and maintenance of the modular mold clamp assembly 100 can be performed. Molds may also be changed in this position. The mold clamp opening/closing device 200 may be maintained in the position shown in FIG. 9 as the work is performed on the modular mold clamp assembly 100.

Alternatively, the mold clamp opening/closing device 200 may be rotated in a clockwise direction, back to the position shown in FIG. 7. As this occurs, the cam follower 156 and the modular mold clamp assembly 100 are maintained in the open position, allowing the work to be performed.

Figure 10:
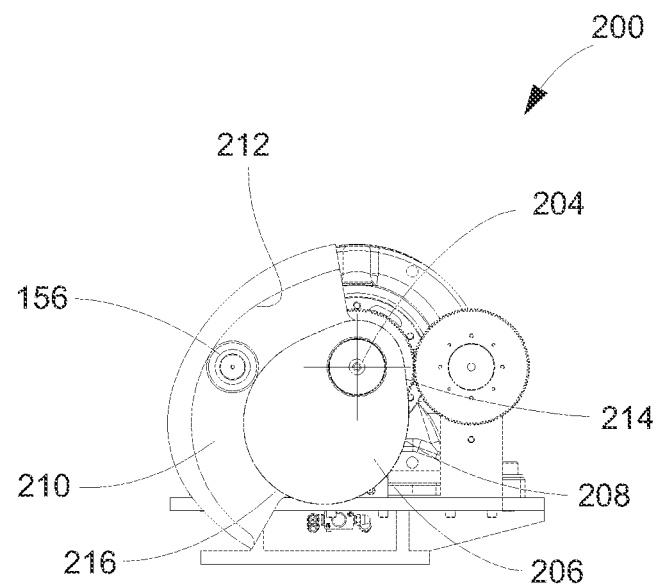
FIG. 10 is a diagrammatic view of the mold clamp opening assembly with a cam follower positioned in the cam track of the mold clamp opening assembly, the cam follower is shown in a position which corresponds to the mold clamp opening assembly being positioned between the open position and the closed position.

It is also worth noting, that lubrication of the parts and other appropriate maintenance of the modular mold clamp assembly 100 may be performed as the mold clamp opening/closing device 200 is in the position shown in FIG. 7 or the position shown if FIG. 8 or any position there between, as represented by FIGS. 8 and 10. The mold clamp opening/closing device 200 may be stopped in any position to facilitate maintenance of the modular mold clamp assembly 100. This allows all parts of the modular mold clamp assembly 100 to be accessed when the modular mold clamp assembly 100 is in different positions, thereby allowing for proper lubrication of all of the required components.

Once the appropriate repair, maintenance or replacement of die halves 132, 134 is completed for the particular mold station 28, the mold clamp opening/closing device 200 is rotated in the counter clockwise direction from the position shown in FIG. 9, through the position shown in FIG. 10 and back to the position shown in FIG. 7. As the mold clamp opening/closing device 200 is rotated, the cam follower 156 enters the cam track 210, as shown in FIG. 9. The cam track 210 has an inner wall which is comprised of the arcuate surface portion 216 of the first cam surface 208 and an outer wall which is comprised of the second cam surface 212. The continued rotation causes the cam follower 156 to engage the second cam surface 212 of the cam track 210, causing the cam follower 156 to be moved outward, away from the center of the turntable 44, as indicated by arrow 226. The outward motion of cam follower 156 causes the modular mold clamp assembly 100 to move back toward the closed position. The full rotation of the mold clamp opening/closing device 200 positions the mold clamp opening/closing device 200 back into the position shown in FIG. 7 and positions the cam follower 156 in the position in which the modular mold clamp assembly 100 is closed. As previously describe with respect to FIG. 7, this represents the position of cam follower 156 and the mold clamp opening/closing device 200 when the machine 20 is in its normal operating mode. In this position, the mold clamp opening/closing device 200 is positioned out of the path 220 of the cam followers 156. This allows for the rotation of the wheel 24 as was previously described.

The mold clamp opening/closing device 200 can be used to open and close each modular mold clamp assembly 100 as often as required to perform the particular maintenance or repair. For instance, if clamp force is to be tested and adjusted, the modular mold clamp assembly may need to be opened and closed more than one time to first measure the initial clamp force, adjust the clamp force, and then measure the adjusted clamp force. In addition, if the modular mold clamp assembly 100 is to be lubricated, it may be beneficial to apply the lubricant when the modular mold clamp assembly 100 is opened, closed or at any position there between.

The wheel 24 is advanced to each station 28 in which repair, replacement or maintenance. When such station 28 is reached, the normal operation of the wheel 24 is again stopped and the procedure described above is repeated. If all stations 28 are to be repaired, replaced or maintained, the wheel 24 will be stopped at each station.

The mold clamp opening/closing device 200 may be operated using electronics, pneumatics, or any other type of system used to operate machine devices. The mold clamp opening/closing device 200 may be operated using various control systems, including, but not limited to, an encoder which is provided in communication with the control system of the machine 20. The mold clamp opening/closing device 200 may also include a safety device to prevent the mold clamp opening/closing device 200 from operating while the machine 20 is in the normal operating mode. The safety device may be, but is not limited to, a push pin mechanism which prevents the rotation of the mold clamp opening/closing device 200 when the machine 20 and wheel 24 are in the normal operating mode, i.e. when articles are being molded.

The use of the mold clamp opening/closing device 200 provides an efficient, user friendly device which allows a technician/operator to perform repairs, maintenance and mold changes without the need for a significant manual force to be applied to the mold clamp to overcome the clamp force. This eliminates the need for a manually operated mold wrench.

The mold clamp opening/closing device has many advantages, including, but not limited to, the mold clamp opening/closing device automatically opens and closes the mold clamp device and the mold to facilitate the repair and maintenance of the mold clamps and allow for the molds to be changed more quickly and efficiently, thereby reducing the downtime of the molding apparatus, reducing the overall cost of the molding apparatus and lessening the impact to the operator or technician performing the replacement, repair and/or maintenance.

In addition, the mold clamp opening/closing device provides the means to move or toggle the drive link 163 of the modular mold clamp assembly 100 into position to properly maintain the clamp force after the cam follower 156 leaves the mold clamp opening/closing device 200. As shown in FIG. 2, drive link 163 straightens out (toggles), stretches the tie bars 124 and compresses the spring pack adjacent platen 128 when the modular mold clamp 100 is in the closed position. Depending on the clamp tonnage, large forces are required to move the clamp off toggle to open the modular mold clamp assembly or, alternatively, back on toggle to fully close the modular mold clamp assembly. In the prior art, a manually operated mold wrench would be used to "pop" the linkage off toggle to open the modular mold clamp assembly. Once "popped", the spring pack would then assist in opening the mold once the drive link goes over center. Closing the modular mold clamp assembly to the closed or toggled position with the mold wrench is much more difficult as the spring force of the spring pack must be overcome from the point that the faces of the mold halves touch to the full over center condition of the link drive. As the clamp force increases, the effort to open/close the molds also increases. Therefore, the mold clamp opening/closing device, not only opens and closes the mold clamp assembly and the molds, the mold clamp opening/closing device also opens a closed mold clamp assembly and mold from a toggled position and toggles a mold clamp assembly and mold closed developing full tonnage.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A rotary molding apparatus comprising:
a rotatable cam member for moving a mold clamp assembly of the rotary molding apparatus between and open and closed position when the rotary molding apparatus is in a stationary position, the rotatable cam member comprising:
a first cam surface, the first cam surface cooperates with a cam follower of the mold clamp assembly to move the mold clamp assembly to the open position when the rotatable cam member is rotated; and
a second cam surface, the second cam surface cooperates with the cam follower of the mold clamp assembly to move the mold clamp assembly from the open position to the closed position when the rotatable cam member is further rotated.

2. The rotary molding apparatus of claim 1, wherein the first cam surface has a generally straight surface portion and a generally arcuate surface portion, the generally straight surface portion cooperating with the cam follower to move the cam follower to the open position.

3. The rotary molding apparatus of claim 1, wherein the second cam surface has a generally arcuate configuration.

4. The rotary molding apparatus device of claim 1, wherein a cam track is provided on the cam member, the cam track comprising an inner wall which includes a generally arcuate surface portion of the first cam surface and an outer wall which includes the second cam surface.

5. The rotary molding apparatus of claim 1, wherein the rotatable cam member is eccentric.

6. The rotary molding apparatus of claim 1, wherein the rotatable cam member is mounted on a shaft which is driven by a motor and controlled by controls of the molding apparatus.

7. A rotary molding apparatus comprising:
a wheel with mold clamp assemblies mounted thereon;
a drive mechanism for driving the wheel;
a rotatable cam member for automatically moving a respective mold clamp assembly between an open and closed position when the rotary molding apparatus is in a stationary position;
whereby as the drive mechanism is disengaged, the rotatable cam member may be moved into cooperation with the respective mold clamp assembly to move the mold clamp assembly to the open position to allow maintenance to be performed on the respective mold clamp assembly.

8. The rotary molding apparatus as recited in claim 7, wherein a first cam surface of the rotatable cam member cooperates with a cam follower of the respective mold clamp assembly to move the respective mold clamp assembly to the open position.

9. The rotary molding apparatus as recited in claim 8, wherein the first cam surface has a generally straight surface portion and a generally arcuate surface portion, the generally straight surface portion cooperating with the cam follower to move the cam follower to the open position.

10. The rotary molding apparatus as recited in claim 9, wherein a second cam surface of the rotatable cam member cooperates with a cam follower of the respective mold clamp assembly to move the respective mold clamp assembly from the open position to the closed position.

11. The rotary molding apparatus as recited in claim 10, wherein the second cam surface has a generally arcuate configuration.

12. The rotary molding apparatus as recited in claim 7, wherein a cam track is provided on the cam member, the cam track comprising an inner wall which includes a generally arcuate surface portion of a first cam surface and an outer wall which includes a second cam surface.

13. The rotary molding apparatus as recited in claim 7, wherein the rotatable cam member is eccentric.

14. The rotary molding apparatus as recited in claim 7, wherein the wheel, the rotatable cam member, and the drive mechanism are mounted on a base of the rotary molding apparatus.

15. A method of accessing a mold clamp assembly of a rotary molding machine, the method comprising:
stopping the movement of the rotary molding machine to position a respective mold clamp assembly proximate to a mold clamp opening/closing device;
engaging the mold clamp opening/closing device to allow the mold clamp opening/closing device to receive a cam followers of the mold clamp assembly therein;
moving a first cam surface of the mold clamp opening/closing device from a first position to a second position to cooperate with the cam follower of the mold clamp assembly to move the cam follower and the mold clamp assembly to an open position; and
moving a second cam surface of the mold clamp opening/closing device from the second position to the first position to cooperate with the cam follower of the mold clamp assembly to move the cam follower and the mold clamp assembly from the open position to a closed position.

16. A method as recited in claim 15, the method further comprising:
rotating the mold clamp opening/closing device to move between the first and the second positions.

17. A method as recited in claim 15, the method further comprising:
controlling the movement of the mold clamp opening/closing device by using a control system of the rotary molding machine.

18. A method as recited in claim 15, the method further comprising:
performing maintenance on the mold clamp assembly when the mold clamp assembly is in the open position.

19. A method as recited in claim 15, the method further comprising:
changing die halves of the mold clamp assembly when the mold clamp assembly is in the open position.

* * * * *